(12) United States Patent
Weber

(10) Patent No.: US 10,867,304 B2
(45) Date of Patent: Dec. 15, 2020

(54) ACCOUNT TYPE DETECTION FOR FRAUD RISK

(71) Applicant: Visa International Service Association, San Francisco, CA (US)

(72) Inventor: Lance Weber, Longmont, CO (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/367,935

(22) Filed: Mar. 28, 2019

(65) Prior Publication Data

US 2019/0220865 A1    Jul. 18, 2019

Related U.S. Application Data

(63) Continuation of application No. 14/193,296, filed on Feb. 28, 2014, now abandoned.

(60) Provisional application No. 61/771,663, filed on Mar. 1, 2013.

(51) Int. Cl.
*G06Q 40/00* (2012.01)
*G06Q 20/40* (2012.01)

(52) U.S. Cl.
CPC ................. *G06Q 20/4016* (2013.01)

(58) Field of Classification Search
CPC combination set(s) only.
See application file for complete search history.

(56) References Cited

U.S. PATENT DOCUMENTS

| | | | |
|---|---|---|---|
| 8,019,678 B2 | 9/2011 | Wright et al. | |
| 8,458,069 B2* | 6/2013 | Adjaoute | G06Q 20/4016 705/35 |
| 8,583,549 B1 | 11/2013 | Mohsenzadeh | |
| 2003/0191709 A1* | 10/2003 | Elston | G06Q 30/0225 705/40 |
| 2010/0036741 A1 | 2/2010 | Cleven | |
| 2011/0302083 A1* | 12/2011 | Bhinder | G06Q 20/32 705/44 |
| 2012/0239557 A1* | 9/2012 | Weinflash | G06Q 20/4016 705/39 |
| 2013/0218682 A1* | 8/2013 | Alterman | G06Q 10/00 705/14.58 |

(Continued)

OTHER PUBLICATIONS

Von Glahn, P.,Grant. (1985). A Distributed System Architecture for Handling Sensitive Information in the Automated Office (computer Security, Networks, Privacy) (Order No. 8609065). (Year: 1985).*

*Primary Examiner* — Muriel S Tinkler
(74) *Attorney, Agent, or Firm* — Kilpatrick Townsend & Stockton LLP

(57) ABSTRACT

A server computer can provide a merchant or other entity with a payment card (or other payment device) detection service that can determine a level of fraud based on the account type being presented (e.g., credit, debit, prepaid, etc.) at the time of purchase. For example, a payment account number (PAN) can be used to perform a database lookup (e.g., a range lookup) to identify the payment account type, which can then be fed into a fraud detection system. The level of fraud can then be used to determine an authorization result (e.g., accept, reject, or review). A use of a merchant processor computer that implements fraud processing can allow a merchant to implement discounting, acceptance, and/or fraud rules based on the card type.

20 Claims, 10 Drawing Sheets

(56) References Cited

U.S. PATENT DOCUMENTS

2013/0268332 A1* 10/2013 Chyu .................... G06Q 30/06
                                                    705/14.17
2013/0332358 A1* 12/2013 Zhao .................... G06Q 20/325
                                                    705/44

* cited by examiner

ACCOUNT TYPE DETECTION FOR FRAUD RISK

CROSS-REFERENCES TO RELATED APPLICATIONS

This application is a continuation of U.S. patent application Ser. No. 14/193,296, filed Feb. 28, 2014, which is a non-provisional application of and claims priority to U.S. Provisional Application No. 61/771,663 titled "Account Detection System and Method"," filed Mar. 1, 2013, which is herein incorporated by reference in its entirety for all purposes.

BACKGROUND

Fraud rules are rules that may be used to automatically detect fraudulent activity. For example, fraud rules may be used to determine if a payment transaction is fraudulent or if a payment account has been compromised. Fraud rules may be evaluated at, e.g., a payment account issuer, payment processing network, merchant processor, or acquirer. If a fraudulent transaction is detected, a fraud rule may reject a transaction, flag the transaction for human review, approve the transaction, or approve/reject and log the transaction.

For many merchants, effective fraud rules are an important way to prevent fraudulent transactions from occurring. However, certain types of risk can be difficult to detect, particularly when a transaction relates to a recurring bill. For example, a consumer may have every intention of paying a phone bill at the time of entering a contract, only later to renege on the contract within a few months.

Embodiments of the invention address these and other problems.

BRIEF SUMMARY

Embodiments of the invention can provide a merchant or other entity with a payment card (or other payment device) detection service that can determine a level of fraud based on an account type being presented (e.g., credit, debit, prepaid, etc.) at the time of purchase. For example, a payment account number (PAN) can be used to perform a database lookup (e.g., a range lookup) to identify the payment account type, which can then be fed into a fraud detection system. The level of fraud can then be used to determine an authorization result (e.g., accept, reject, or review). Embodiments can optionally integrate with a merchant processor computer that implements fraud processing. This integration can allow a merchant to implement discounting, acceptance, and/or fraud rules based on the card type.

One embodiment of the invention is directed to a method for processing an authorization request for a transaction. A server computer receives transaction information and the authorization request for the transaction. The transaction information includes a payment account number. The server computer obtains a payment account type corresponding to the payment account number. The transaction information and the payment account type are sent to a fraud detection engine of the server computer. The fraud detection engine determines a level of fraud using the payment account type and the transaction information. An authorization result for the transaction is determined based on the fraud level. The authorization result can then be provided.

Other embodiments are directed to systems and computer readable media associated with methods described herein.

Further details regarding embodiments of the invention can be found in the Detailed Description and the Figures.

DEFINITIONS

Figure 1:
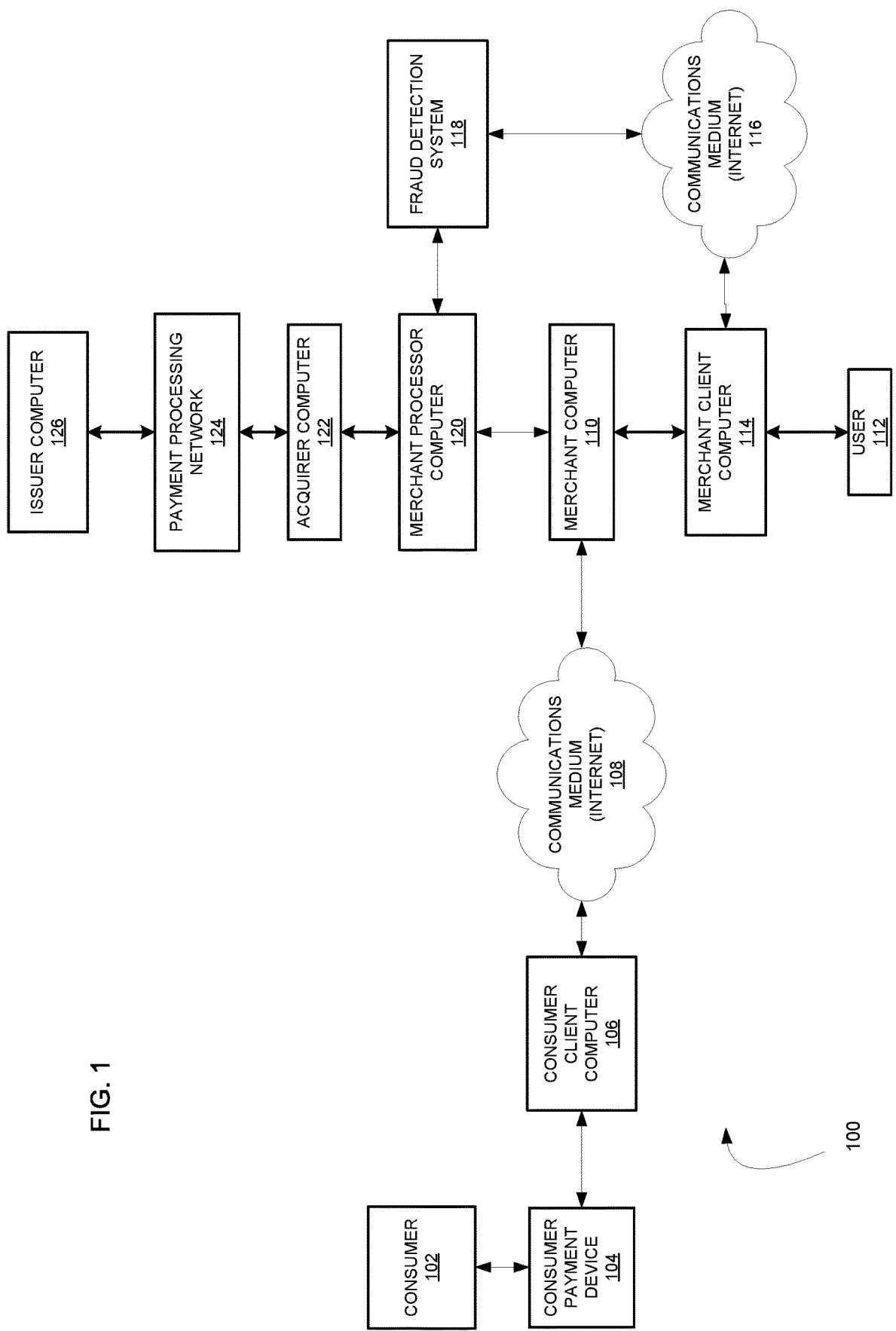
FIG. 1 shows a system according to an embodiment of the invention.

Prior to discussing embodiments of the invention, some descriptions of some terms may be helpful in understanding embodiments of the invention.

The term "server computer" may include a computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

The term "client computer" may include any suitable computational apparatus. The client computer may be operated by a consumer, a user associated with a merchant, or any other individual. The client computer may use any suitable wired or wireless network, including the Internet, in order to communicate with other systems. For example, a consumer client computer may be used by a consumer to interact with a merchant Internet storefront in order to conduct a transaction. A merchant client computer may be used by a user associated with a merchant to interact with other merchant computer systems and a fraud detection system. Examples of computers and consumer mobile devices include any device capable of accessing the Internet, such as a personal computer, cellular or wireless phones, personal digital assistants (PDAs), tablet PCs, and handheld specialized readers.

The term "fraud detection system" (also referred to as a "fraud detection engine") may include a single computer, part of a larger computer system (e.g., a server computer), or a network of suitable processing entities (e.g., computers) that may have the ability to receive, process and evaluate transaction details to provide fraud detection services. The fraud detection system may have or operate at least a server computer and may include a plurality of databases. The fraud detection system may include a selection of fraud detection rules and merchant profiles that can be created, modified, and/or deleted. The fraud detection system may further record an audit log of modifications made to customizable settings, the selection of fraud detection rules, and merchant profiles that reside within the system.

The term "fraud detection rule" may refer to a rule in the fraud detection system, and may include a customizable rule. Each fraud detection rule may allow customization as to name, description, category, status as a core rule, and for further processes or actions to be taken if the fraud detection rule is triggered. Each fraud detection rule may further allow for rule conditions to be established based on a number of criteria.

The term "merchant profile" may include a selection of fraud detection rules and settings established by a merchant with the fraud detection system. A merchant profile may be added, modified or deleted in the fraud detection system. The merchant profile may include customizable settings for name, profile description, and a selection of fraud detection rules. The merchant profile may be associated with one or more users who have access to modify the selection of fraud detection rules contained in the merchant profile.

The term "modification" may include additions, deletions, conversions, or any alterations to a preexisting fraud detection rule. It may also refer to additions, deletions, conversions, or any alternations to a merchant profile. Modification may also refer to the creation of new fraud detection rules or merchant profiles. For example, the modification may be to add or delete a condition within a fraud detection rule, and/or the modification may be to add or delete an entire fraud detection rule within a merchant profile. Modifications may also refer to changes to text fields and setting contained within a fraud detection rule or merchant profile.

The term "database" may include any hardware, software, firmware, or combination of the preceding for storing and facilitating retrieval of information. Also, the database may use any of a variety of data structures, arrangements, and compilations to store and facilitate retrieval of information.

The term "fraud rules modification database" may refer to a database in the fraud detection system that stores information regarding modifications made to settings and/or conditions in fraud detection rules and/or merchant profiles. The fraud rules modification database may further store information regarding the user ID of users that effected the modifications to fraud detection rules and/or merchant profiles.

The term "user" may refer to an individual or entity who can access the fraud detection system using credentials (e.g. merchant ID, user ID and password) that the individual or entity is authorized to use. As used herein, a user may also refer to an individual or entity that is not authorized to access the fraud detection system, but has access to authorized credentials allowing them access to the fraud detection system. The user can access merchant profiles and fraud detection rules and make modifications to merchant profiles and/or fraud detection rules that are then associated with the user ID logged into the fraud detection system and stored in the fraud rules modification database.

An "issuer identifier" may include any series of letters, numbers, characters, or any combination thereof which identify an issuing bank and/or a payment account type for the account issued by the bank. A "payment account type" may correspond to any category for the account (e.g., debit/credit, personal/commercial, platinum/gold, etc.). For example, the issuer identifier may include a bank identification number (BIN) associated with a bank that has issued a payment account associated with a portable device (e.g., credit card) of a particular type being used by a consumer during a transaction. A BIN may be part of a primary account number (PAN) and can include a bank identifier and an account type identifier. The bank identifier can identify which bank has issued the payment account and allows a payment processor to determine where a transaction authorization request message should be routed. The account type identifier can be used to determine a payment account type, which can be used in determining a level of fraud. A PAN can also include an "account identifier," which may identify a specific user's account at a particular bank that issued an account of a particular type.

A "level of fraud" (also called a "fraud level") may correspond to any score, ranking, or a classification that identifies a risk in accepting a transaction (e.g., a risk of not receiving full payment). A fraud level can be used to determine an "authorization result," which may correspond to any response to an authorization request. Examples of an authorization result include accept, reject, or review, as well as a proposed change to the transaction (e.g., a change in the price or a change in the goods or services of the transaction).

DETAILED DESCRIPTION

Consumers can buy goods and services using a variety of different accounts, such as credit cards, debit cards, prepaid cards, and gift cards, each of which may have various subtypes (e.g., for levels of service, warranties, rewards, etc.). Embodiments can use the account number to perform an account lookup to identify the account type. The account type can be fed into a rules engine. The rules engine can determine a level of fraud based on the account type. An authorization result can be determined based on the level of fraud. Examples of an authorization result include whether to accept authorize/accept the transaction and a discount based on account type.

The type of account can be used for specific fraud rules, specific payment processing rules (e.g., discounts), or specific authorization/acceptance rules. For example, the rules engine can determine an authorization of the transaction, a discount, or a change in the goods or services based on a level of fraud. A result of the fraud rules might be a requirement that a larger amount must be pre-paid (e.g., on a phone plan if a pre-paid card is used), or that the transaction is flagged for review. The larger amount relates to more months being paid, and thus is a change to the goods and services of the transaction.

Example embodiments are typically implemented in the context of a financial transaction. Therefore, prior to further discussing an account detection capability within fraud detection, a brief description of transaction processing will be presented.

I. System Overview

An exemplary system 100 for transaction processing can be seen in FIG. 1. The system 100 includes a consumer 102, a consumer payment device 104, a consumer client computer 106, a merchant computer 110, a user 112, a merchant client computer 114, a fraud detection system 118, a merchant processor computer 120, an acquirer computer 122, a payment processing network 124, and an issuer computer 126. In a typical transaction, a consumer 102 may purchase goods or services at a merchant associated with the merchant computer 110 using a consumer payment device 104. The transactions details are then sent to merchant processor computer 120 and to acquirer computer 122. Acquirer computer 122 can communicate with issuer computer 126 via payment processing network 124 for additional transaction processing. For simplicity of illustration, a certain number of components are shown is shown in FIG. 1. It is understood, however, that embodiments may include more than one of each component. In addition, some embodiments may include fewer than all of the components shown in FIG. 1. Also, the components in FIG. 1 may communicate via any suitable communication medium (including the internet), using any suitable communication protocol. And, any component can communicate data directly with another component even though lines are not directly the two components.

Consumer client computer 106 may communicate with merchant computer 110 via a communications medium 108, such as a network (e.g. the Internet). Consumer 102 may be an individual, or an organization such as a business, that is capable of purchasing goods or services. Consumer 102 can use consumer client computer 106 to conduct a transaction with the merchant. Consumer client computer 106 may be in any suitable form.

Similarly, merchant client computer 114 may communicate with fraud detection system 118 via a communications medium 116, such as a network (e.g. the Internet). User 112 may be a merchant, an employee of the merchant, or any other individual who has access to merchant client computer 114. User 112 can use merchant client computer 114 to access fraud detection system 118.

Consumer payment device 104 may be in any suitable form. For example, suitable consumer payment devices can be hand-held and compact so that it can fit into a consumer's wallet and/or pocket (e.g., pocket-sized). Consumer payment device 104 can include a processor, and memory, input devices, and output devices, operatively coupled to the processor. Specific examples of consumer payment devices include cellular or wireless phones, personal digital assistants (PDAs), pagers, portable computers, smart cards, and the like. The consumer payment devices can also be debit devices (e.g., a debit card), credit devices (e.g., a credit card), or stored value devices (e.g., a pre-paid or stored value card).

Merchant computer 110 may be comprised of various modules that may be embodied by computer code, residing on computer readable media. It may include any suitable computational apparatus operated by a merchant. Examples of merchant computers may include an access device or an internet merchant computer. Merchant computer 110 may be in any suitable form. Merchant computer 110 can receive transaction data from consumer client computer 106 and transmit the transaction data to merchant processor computer 120 for fraud evaluation and for further transaction authorization processes. Merchant computer 110 can further communicate with and/or receive input from merchant client computer 114 operated by user 112.

Merchant processor computer 120 can analyze transaction details for fraud, e.g., using fraud detection system 118. Transactions that are determined to be fraudulent can be transmitted back to merchant computer 120. The analysis can be performed before or after an authorization request is sent by merchant processor computer 120 to issuer computer 126, e.g., via acquirer computer 122 and payment processing network 124, which may determine an appropriate issuer computer. Issuer computer 126 can send an authorization response message approving or denying the transaction to merchant processor computer 120.

Acquirer computer 122 is typically a system for an entity (e.g. a bank) that has a business relationship with a particular merchant or other entity. Issuer computer 126 is typically a business entity (e.g. a bank) which maintains financial accounts for the consumer 102 and often issues consumer payment device 104 such as a credit or debit card to consumer 102. In some embodiments, entities can perform both issuer computer 126 and acquirer computer 122 functions.

Figure 2:
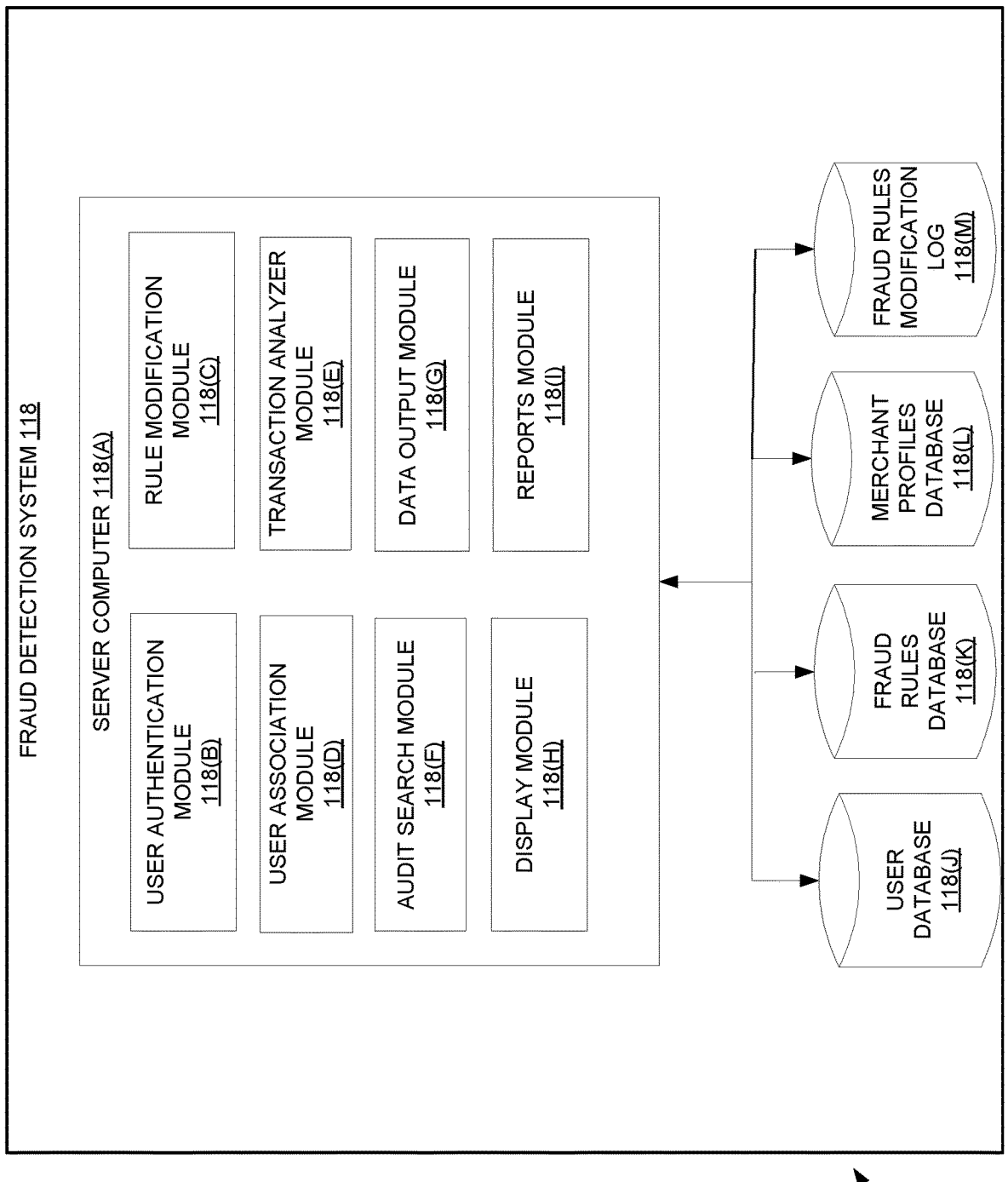
FIG. 2 shows an exemplary fraud detection system that may be used in embodiments of the invention.

As depicted in FIG. 2, fraud detection system (engine) 118 may comprise a server computer 118(A), comprising a user authentication module 118(B), a rule modification module 118(C), a user association module 118(D), a transaction analyzer module 118(E), an audit search module 118(F), a data output module 118(G), a display module 118(H), and a reports module 118(I). The various modules described herein may be embodied by computer code, residing on computer readable media. Server computer 118(A) may be operatively coupled to one or more databases. The one or more databases may comprise a user database 118(J), a fraud rules database 118(K), a merchant profiles database 118(L) and a fraud rules modification database 118(M).

User authentication module 118(B) handles the verification of the authorization credentials for a user (e.g. merchant ID, user name, password). User authentication module 118 (B) may access user database 118(J) in determining whether user 112 seeking access to fraud detection system 118 is an authorized user. For example, when presented with credentials, user authentication module 118(B) may access user database 118(J) to determine whether the provided user name is in user database 118(J) and whether the provided password corresponds to the password linked to the user name.

Rule modification module 118(C) receives modifications from user 112 to fraud detection rules or to a merchant profile. Rule modification module 118(C) may further access merchant profiles database 118(L) to store modifications made to a merchant profile. For example, when user 112 makes a modification, rule modification module 118(C) may access merchant profile database 118(L) associated with the authorization credentials entered by the user 112. Rule modification module 118(C) may also access fraud rules database 118(K) to access pre-established fraud detection rules to add to the merchant profile or to store newly created fraud detection rules created by the user for the merchant profile. In some embodiments, new fraud detection rules created by the user are stored in merchant profiles database 118(L) with the corresponding merchant profile.

User association module 118(D) may associate any modifications made by user 112 with the authorization credentials entered by user 112. For example, if user 112 logged into fraud detection system 118 with the user name "user1," user association module 118(D) may record all the modifications made by user 112, associate the modifications with the user name "user1," and store the data in fraud rules modification database 118(M).

Transaction analyzer module 118(E) may evaluate transaction data received by fraud detection system 118 from merchant processor computer 120. Fraud detection system 118 can receive the authorization response message from the merchant processor computer 120, and the message can be analyzed by transaction analyzer module 118(E). If the result from transaction analyzer module 118(E) is an "ACCEPT", the transaction between the merchant and consumer 102 can be completed. If the result from transaction analyzer module 118(E) is a "REJECT", fraud detection system 118 may return a message (or not return a message) to be presented to consumer 102 that consumer 102 may be contacted if there are any issues. If the result from transaction analyzer module 118(E) is a "REVIEW", fraud detection system 118 can "hold" the transaction for further review to determine whether it should be accepted or rejected. In some embodiments, fraud detection system 118 can automatically invoke a clearing and settlement process upon an accept decision by transaction analyzer module 118(E).

Audit search module 118(F) handles the audit log search function of fraud detection system 118. Audit search module 118(F) receives input from user 112 comprising search parameters to conduct an audit log search. Audit search module 118(F) processes the search parameters and conducts a search of fraud rules modification database 118(L). Data output module 118(G) outputs the results of the audit log search conducted by audit search module 118(F) to be displayed to the user 112.

Display module 118(H) displays the layout of fraud detection system 118. Fraud detection system 118 can be accessed as a website over a communications medium (e.g. the Internet), via an Internet-enabled device capable of displaying HTML. Other embodiments allow fraud detection system 118 to be displayed in other suitable manners on other suitable display devices.

Reports module 118(I) compiles the data obtained from fraud detection system 118 from analyzing transactions. Reports module 118(I) can provide detailed statistics and data for the merchant on the performance of the merchant's profile and selection of fraud detection rules. For example, reports module 118(I) can prepare a report indicating the number of times each fraud detection rule was triggered by a transaction. It can further indicate the results of analyzed transactions (e.g. accepted, rejected, or sent for further review). Reports module 118(I) can present the full transaction details for each transaction received by fraud detection system 118.

User database 118(J) may be used by server computer 118(A) to store authentication elements for users. For example, user database 118(J) may contain a plurality of merchant IDs and associated user names authorized to access the corresponding merchant profile stored in merchant profiles database 118(L) in fraud detection system 118. User database 118(J) may further store passwords associated with each merchant ID and user name authorized to access the fraud detection system 118.

Fraud rules database 118(K) may be used by server computer 118(A) to store fraud detection rules that can be added to merchant profiles. In embodiments, a merchant profile can be loaded with pre-existing rules contained in fraud rules database 118(K). Fraud rules database 118(K) may further store new rules created by a user 112.

Merchant profiles database 118(L) may be used by server computer 118(A) to store merchant profiles that are customized for each merchant that has created a profile with fraud detection system 118. Merchant profile database 118(L) may further store fraud detection rules that have been created for a merchant and associated with a merchant profile.

Fraud rules modification database 118(M) may be used by server computer 118(A) to store an audit log containing details regarding fraud detection rules, modifications made to the fraud detection rules, and the user name of user 112 who made the modifications to the fraud detection rules. The data stored in fraud rules modification database 118(M) may be stored by rule modification module 118(C) and may be searched by audit search module 118(F).

Figure 3:
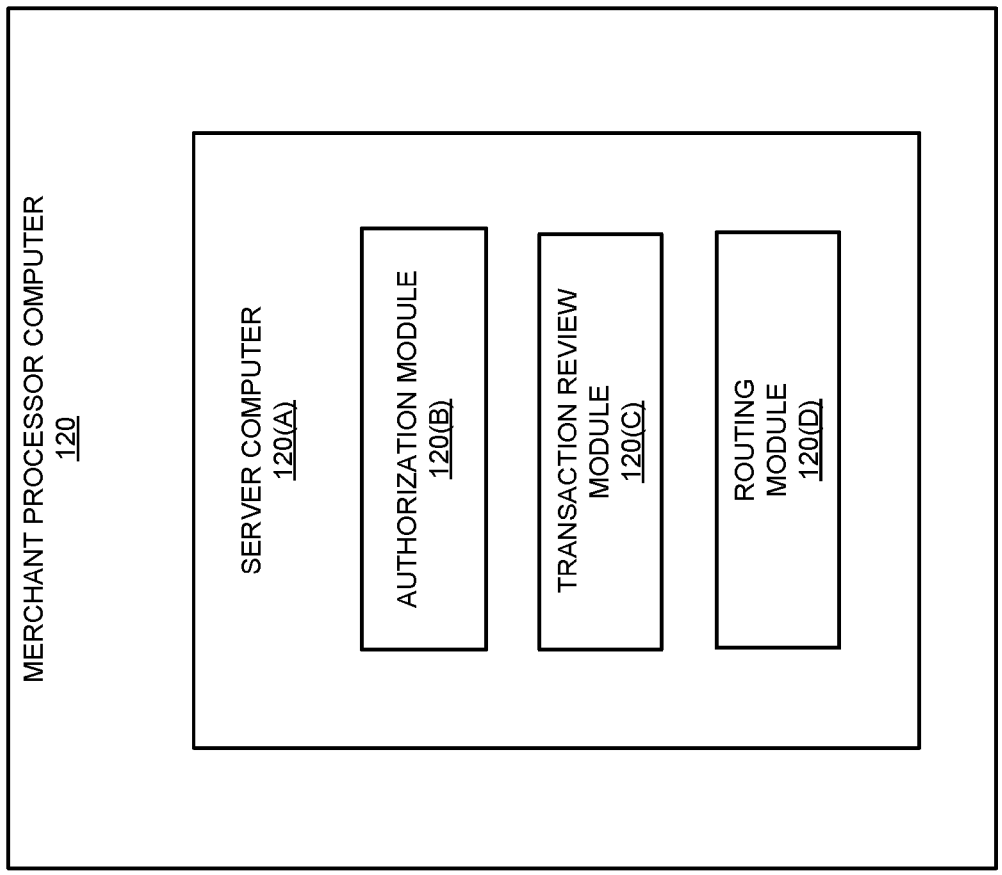
FIG. 3 illustrates an exemplary merchant processor computer according to some embodiments of the invention.

As depicted in FIG. 3, merchant processor computer 120 may comprise a server computer 120(A) comprising an authorization module 120(B), a transaction review module 120(C), and a routing module 120(D). Authorization module 120(B) may generate and process authorization request and response messages. Authorization module 120(B) may also determine the appropriate destination for the authorization request and response messages. An authorization request message is a message sent requesting that issuer computer 126 authorize a financial transaction. An authorization request message may comply, e.g., with ISO 8583, which is a standard for systems that exchange electronic transactions made by consumers using payment devices. In various embodiments, an authorization request message may include, among other data, a Primary Account Number (PAN) and expiration date associated with a payment device (e.g. credit/debit card) of the consumer, amount of the transaction (which may be any type and form of a medium of exchange such a money or points), and identification of a merchant (e.g. merchant ID). In embodiments, an authorization request message is generated by a server computer (if the transaction is an e-commerce transaction) or a Point of Sale (POS) device (if the transaction is a brick and mortar type transaction) and is sent to issuer computer 126.

Transaction review module 120(C) conducts a fraud evaluation for transactions. If transaction review module 120(C) determines that the transaction may be fraudulent, transaction review module 120(C) may determine that the transaction should be denied. If the transaction is not fraudulent, transaction review module 120(C) may determine that the transaction should be allowed. If transaction review module 120(C) is unable to determine whether the transaction is fraudulent, transaction review module 120(C) can send the transaction for further review.

Routing module 120(D) can route transactions to the appropriate destination. If a transaction is determined to be not fraudulent, routing module 120(D) can route the message to acquirer computer 122 for further processing, e.g., as part of an authorization request message or for clearing and settlement. If the transaction is determined to be fraudulent, routing module 120(D) can send the transaction back to the merchant. If the fraud evaluation conducted by transaction review module 120(C) is indeterminate, the transaction can be routed to a further review by a person.

Figure 4:
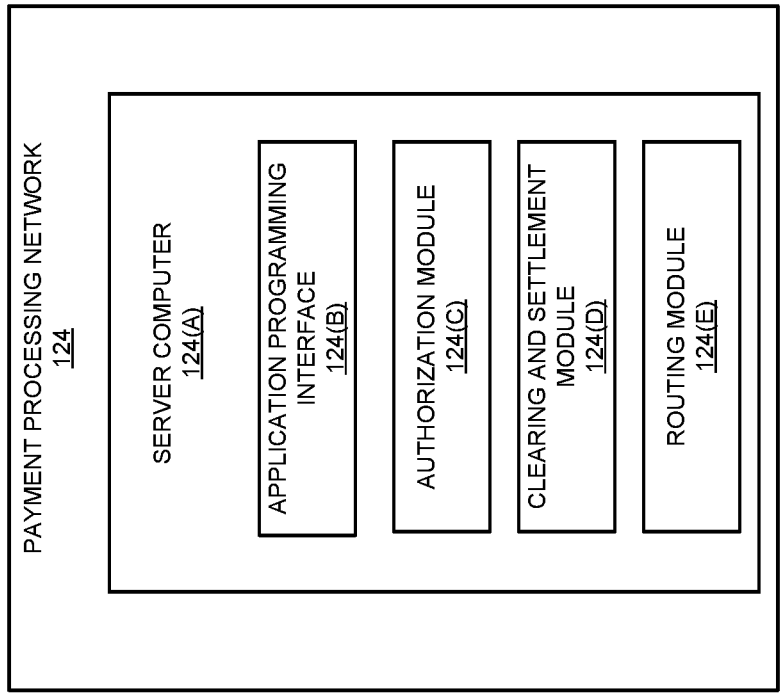
FIG. 4 illustrates an exemplary payment processing network according to some embodiments of the invention.

As depicted in FIG. 4, payment processing network 124 may comprise a server computer 124(A) comprising an application programming interface 124(B), an authorization module 124(C), a clearing and settlement module 124(D), and a routing module 124(E). Payment processing network 124 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. Payment processing network 124 may use any suitable wired or wireless network, including the Internet.

Authorization module 124(C) processes authorization request messages and determines the appropriate destination for the authorization request messages. Clearing and settlement module 124(D) handles the clearing and settlement of transactions. These modules authenticate user information and organize the settlement process of user accounts between acquirer computer 122 and issuer computer 126. An example of the clearing and settlement module is Base II, which provides clearing, settlement, and other interchange-related services to VISA members.

Routing module 124(E) handles the routing of authorization request messages from acquirer computer 122 to issuer computer 126, and the routing the authorization response messages back from issuer computer 126 to acquirer computer 122.

II. Account Detection

Embodiments can use a payment account number (PAN) to determine a payment account type, such as a credit or debit card. The PAN can include an issuer identifier that identifies the issuing bank (e.g., via a bank identifier) and/or the payment account type (e.g., via a payment account identifier). A PAN is typically 16 digits, with the first 1 to 9 digits being a bank identification number (BIN). In an embodiment where the BIN is 6 digits, the first four digits of a BIN can correspond to a bank identifier, and the next two digits can correspond to a payment account identifier. An account database can store the BIN values associated with corresponding banks and account types. These BIN lookup tables can be used to obtain an account type. In other embodiments, additional digits can be used to obtain further information from queries to such databases.

Examples of account types include a credit, debit or prepaid. The account type can include subtypes. For example, subtypes of the credit card can include a rewards card, a platinum card, or a rewards platinum card. Different account types can correspond to different numbers or different ranges of numbers (e.g., ranges for the digits of the payment account identifier). Different issuing banks can also correspond to different numbers or ranges of numbers (e.g., ranges for the digits of the bank identifier). The account databases can be accessed by various entities, such as a merchant computer, a merchant processor computer, an acquirer computer, and a payment processing network, as well as third party aggregators.

Figure 5A:
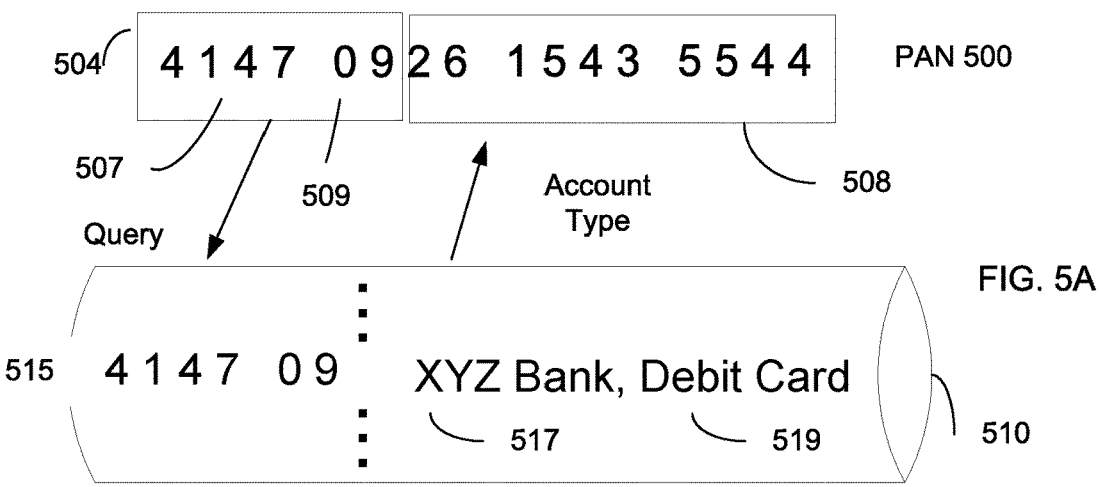
FIGS. 5A-5C show diagrams illustrating a use of a payment account number and a query to a database to obtain an account type according to embodiments of the present invention.
Figure 5B:
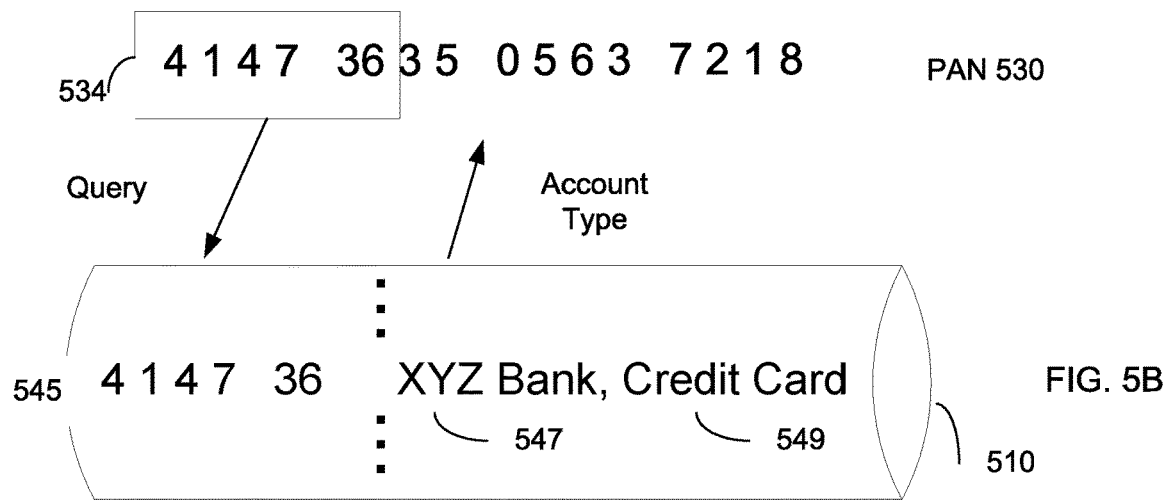
Figure 5C:
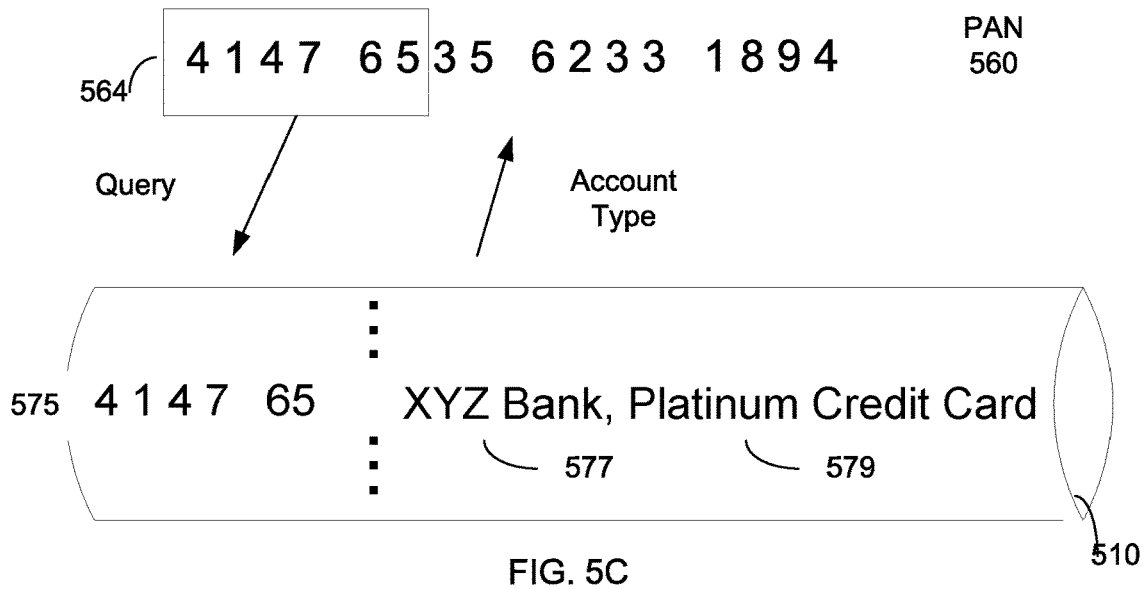

FIGS. 5A-5C show diagrams illustrating a use of a payment account number and a query to a database to obtain an account type according to embodiments of the present invention. In FIG. 5A, a PAN 500 is shown comprising a BIN 504 and an account identifier 508. BIN 504 includes an account type identifier 509, and may include a bank identifier 507. These identifiers may be used in conjunction or separately to obtain bank information 517 and account type information 519. PAN 500 may be parsed to determine BIN 504 (or other issuer identifier). BIN 504 can be identified in its entirety, or just account type identifier 509 may be determined.

A query can be made to database 510 using BIN 504 of PAN 500. The query can include just account type identifier 509, BIN 504, or other issuer identifier. Database 510 can comprise one or more tables that have entries corresponding to BINs associated with bank information and account type of information. In another embodiment, separate tables can exist for bank identifiers and payment account identifiers. Entry 515 is shown corresponding to BIN 504 of PAN 500. Bank information 517 and account type information 519 is shown in entry 515. A response to the query can be provided with the account type information 519 and bank information 517, as well as any other information corresponding to entry 515. In this example, bank information 517 indicates the issuing bank is XYZ Bank, and account type information 519 indicates that the account type is a debit card. Database 510 can implement any suitable database structure, arrangement, and query schema.

In FIG. 5B, a PAN 530 is shown comprising a BIN 534. A query can be made to database 510 using BIN 534. Entry 545 is shown corresponding to BIN 534 of PAN 530. Bank information 547 and the account type information 549 are shown in entry 545. In this example, bank information 547 indicates the issuing bank is XYZ Bank, and account type information 519 indicates that the account type is a credit card. As with FIG. 5A, a response can be provided with the account type.

As shown, BIN 534 differs from BIN 504 in the last two digits. In an embodiment where the first four digits correspond to an issuing bank, the issuing bank can be the same when the first four digits of the BIN are the same. Thus, bank information 517 and bank information 547 both indicate that XYZ Bank is the issuing bank corresponding to 4147. Since the last two digits of the BINs differ, account type information 519 and 549 differ, with account type information 519 corresponding to a debit card and account type information 549 corresponding to a credit card.

In FIG. 5C, a PAN 560 is shown comprising a BIN 564. A query can be made to database 510 using BIN 564. Entry 575 is shown corresponding to BIN 564 of PAN 560. As shown, BIN 564 differs from BIN 534 in the last two digits, while the first four digits are the same and still indicate the issuing bank is XYZ Bank (as indicated in bank of information 577). The last two digits indicate account type information 579. As shown, the account type information 579 includes a subtype, which is shown as a platinum subtype for the credit card.

The entries in database 510 can be stored in various ways. For example, the first table can store the bank identifier (e.g., first four digits) of the BIN. Once the issuing bank is identified using the bank identifier, a second table can be queried using the payment account identifier, where the second table corresponds to the bank identifier. For example, each bank identifier can correspond to a different second table that stores the account types for that bank identifier.

The account type information can include various types of information, such as a payment network corresponding to the account, a financial category of the account (e.g., credit, debit, prepaid), a service category of the account (e.g., Platinum or Gold), or user category (e.g., commercial/business or personal), and a rewards category.

III. Use of Detected Account

Once a payment account type is obtained, a fraud analysis can be performed using the payment account type. The account type can be obtained in various ways, by various server computers, and at various times.

A. Method

Figure 6:
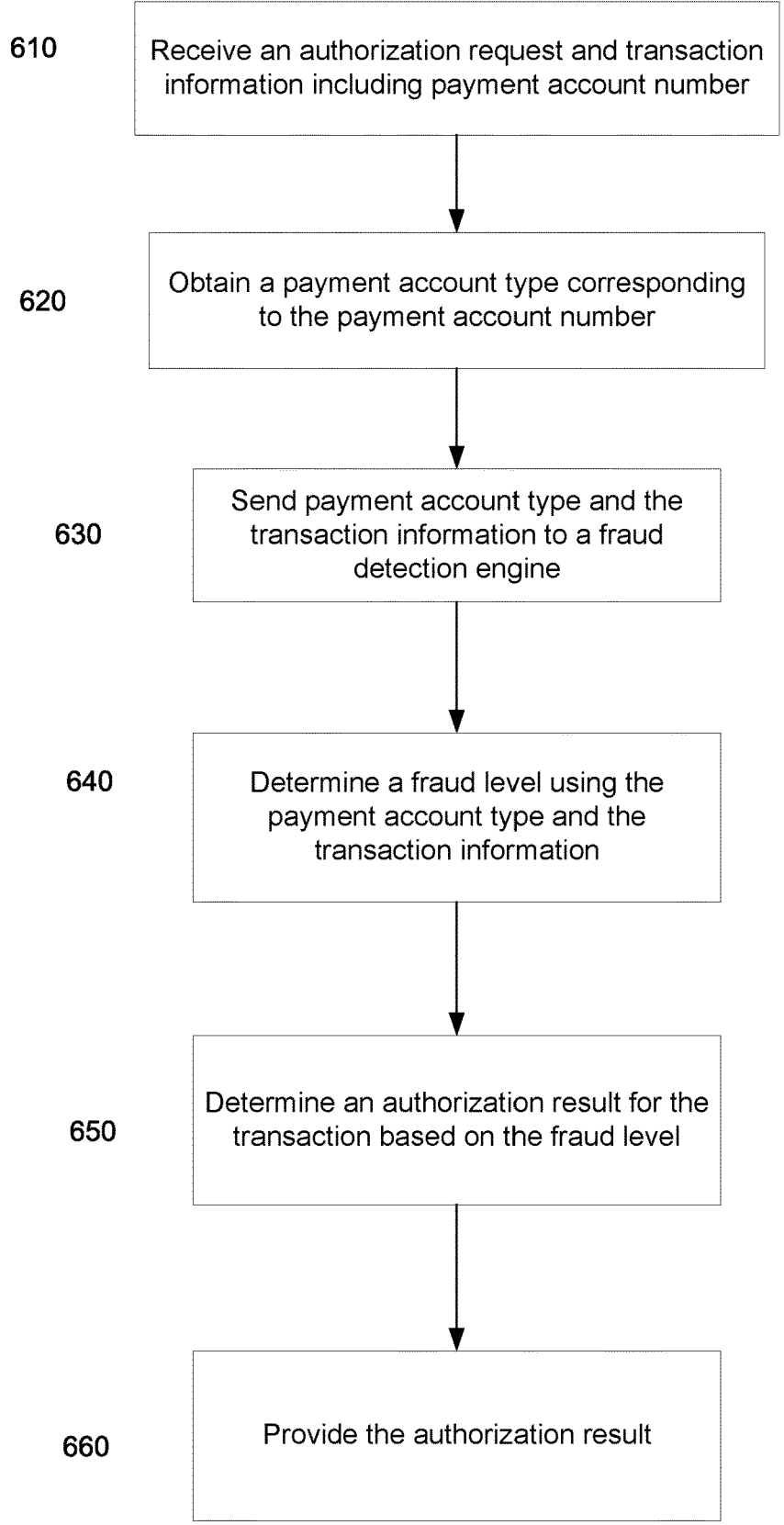
FIG. 6. Is a flowchart of a method for processing an authorization request for a transaction according to embodiments of the present invention.

FIG. 6. is a flowchart of a method 600 for processing an authorization request for a transaction according to embodiments of the present invention. Method 600 can be performed by one or more computers.

At block 610, a server computer receives transaction information and the authorization request for the transaction. The transaction information includes a payment account number. The transaction is for a purchase of goods or services. In various embodiments, the server computer can correspond to merchant processor computer (e.g., 120) or a payment processing network (e.g., 124). The server computer can receive the transaction information and the authorization request directly or indirectly from a merchant computer.

At block 620, the server computer obtains a payment account type corresponding to the payment account number. In one implementation, the server computer can perform a database query using all or a portion of the payment account number to obtain the payment account type. For example, an issuer identifier (e.g., a BIN) that includes an account identifier can be used to retrieve the payment account type from an account database.

The database query can be made to a database that is local to the server computer. In another embodiment, the server computer can receive the payment account type with the authorization request (e.g., when a merchant computer performs a database query). In yet another embodiment, the server computer can send a request to an external service (e.g., provided by payment processing network 124) for the payment account type, where the request to the external service includes the payment account number.

At block 630, the server computer sends the transaction information and the payment account type to a fraud detection engine of the server computer. In one embodiment, server computer comprises a plurality of computers, where the fraud detection engine (system) runs on a portion of the plurality of computers.

At block 640, the fraud detection engine determines a fraud level using the payment account type and the transaction information. As examples, the fraud level can be a number or a text classification (e.g., high, medium, low). The level of fraud can be determined in a variety of ways. In one embodiment, conditional logic (e.g., IF statements) can be used. For example, a particular account type can correspond to a particular fraud level when the transaction amount is above a certain value and the transaction is to be recurring. The conditional logic can determine an authorization result directly, such that the fraud level has a one to one correspondence with the authorization result.

In another embodiment, a weighted average or sum of values can be used, where one of the values corresponds to a payment account type. For instance, various payment account types could be assigned a different score (e.g., a debit card can be assigned a different value than a credit card). Other values that are part of the weighted sum can include the transaction amount, a velocity score for a number of transaction in a period of time, an amount of chargebacks, and an amount of discount provided as part of a long term contract (e.g., a discount given on a phone) for the recurring payments. Each of the values can be given a different weight based on an assigned importance. Machine learning techniques (such as a neural network) and other suitable techniques can also be used, where the payment account type (e.g., as an assigned score) is fed into a model.

In one implementation, the level of fraud is a fraud risk score. A merchant fraud risk score for a potential transaction can be based on an estimate of risk that the transaction will lose money for the merchant. The risk score can be based on the other party's (e.g., the consumer's) history of chargebacks, inconsistent Internet Protocol (IP) address, a velocity of purchases on accounts, and other data. The fraud level can be normalized, e.g., to be between 0 and 1.

Other factors for determining a fraud level can include the country of origin for the issuing bank. Some countries can have a higher fraud risk than others. And, the country of the issuing bank can be compared to a current location of the transaction (e.g., location of a website or a physical location of the merchant), as well as where an item is to be shipped.

At block 650, an authorization result of the transaction is determined based on the fraud level. The authorization result can be determined by the fraud detection engine or other part of the server computer. To determine the authorization result, the fraud level can be compared to various thresholds and threshold ranges, which can be specified by the merchant. For example, a particular numerical range can correspond to acceptance, and another numerical range can correspond to a rejection. In instances where the fraud level is a classification, one authorization result can correspond to one classification.

In other embodiments, conditional logic with the fraud level can be used in conjunction with other factors. For example, once the fraud level is compared to a numerical range (or other corresponding values), the values of other criteria can dictate the authorization result. For instance, the authorization result can differ based on the transaction amount or the particular merchant. In one embodiment, the authorization result can follow directly from conditional logic that identifies the result (e.g., if debit card than the result is a review).

At block 660, the authorization result provided. For example, when the authorization request is received from a merchant computer, the authorization result can be sent to the merchant computer. The authorization result can indicate various actions to a merchant computer. For example, the authorization result can provide an indication to reject or accept the transaction, or to review the transaction. For a result of review, the market representative can be contacted to review the transaction. Further, the authorization result can identify possible discounts to provide to the consumer.

B. Merchant Processor Performs Account Lookup

Figure 7:
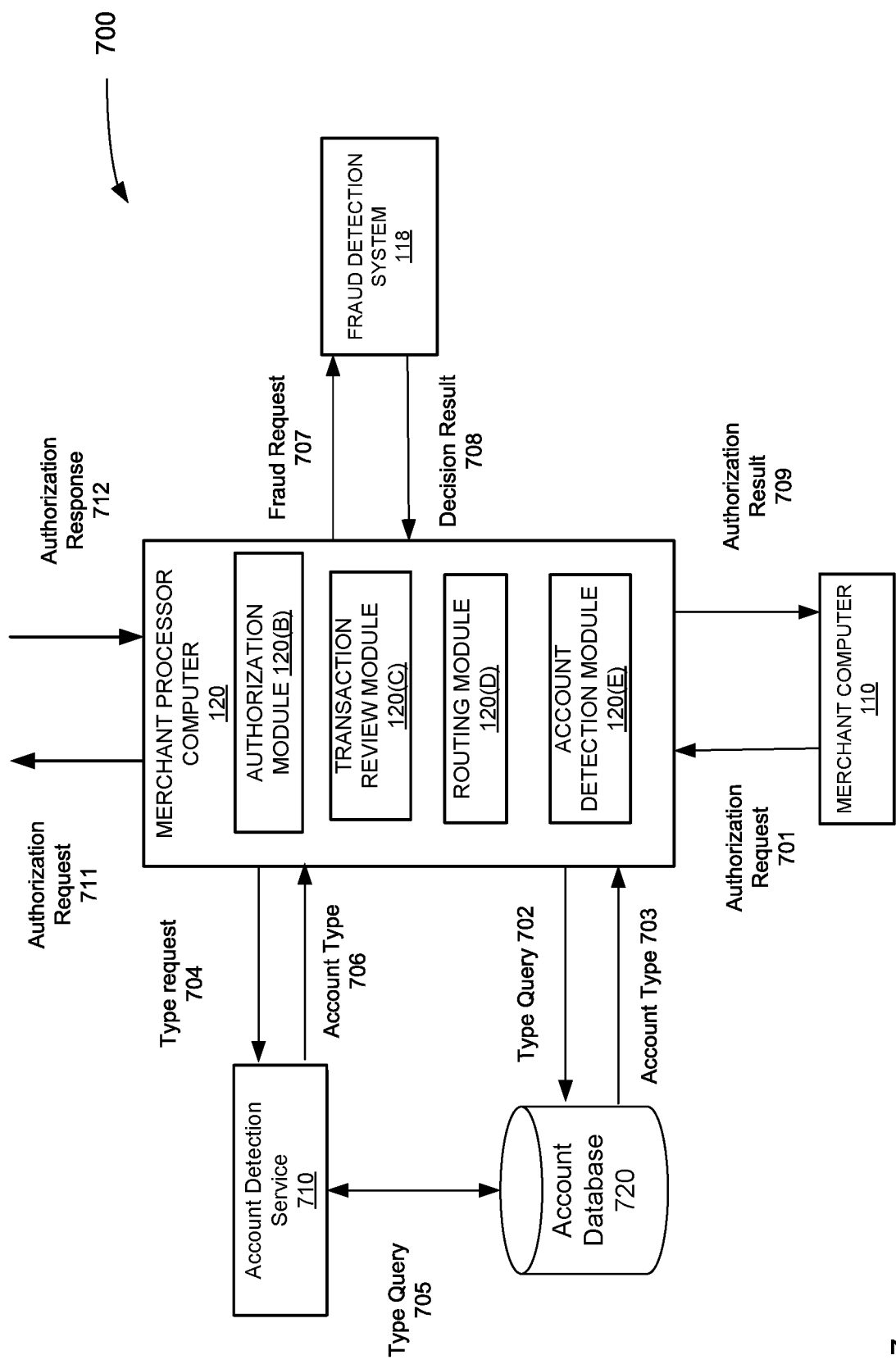
FIG. 7 shows a system and a corresponding workflow for processing an authorization request to provide an authorization result according to embodiments of the present invention.

FIG. 7 shows a system 700 and a corresponding workflow for processing an authorization request to provide an authorization result according to embodiments of the present invention. Various workflows are described with respect to system 700.

Merchant computer 110 sends an authorization request 701 to merchant processor computer 120. The authorization request can include a payment account number (PAN). The authorization request can be for a transaction between merchant computer 110 and a consumer. For example, the consumer can be on a merchant website or at a physical merchant store using an access device (e.g., a point-of-sale device).

The authorization request can include an account detection request such that merchant processor computer 120 is instructed to detect an account type. The authorization request can also provision other functionality in system 700, e.g., a function for determining a level of fraud based on an account type, a function for tokenizing the transaction, or functions for other actions depending on the account type. In some cases, specific functionality can be provided after receiving information about the account type. For example, specific fraud rules, specific payment processing rules, or specific acceptance rules can be applied or provided.

Merchant processor computer 120 can validate authorization request 701 and parse the PAN for an account type identifier (as well as a bank identifier), which may be part of a BIN. Either of the identifiers can be used independently to perform a lookup of bank information and account type information, or together in a BIN range lookup to determine both in a single query.

In one implementation, merchant processor computer 120 can include an account database 720 that includes information about account types, and can include bank information. Account database 720 can correspond to database 510 in FIG. 5. A type query 702 can be submitted to account database 720, and an account type 703 can be returned. In various embodiments, type query 702 can include just the account type identifier, an issuer identifier (which includes the account type identifier and a bank identifier), or the entire PAN. Bank information can also be received as a result of the query. In one embodiment, the obtaining of the account type can be performed by account detection module 120(E).

In another implementation, merchant processor computer 120 can send an account type request 704 to an account detection service 710, which can send a type query 705 to account database 720. Account type request includes the account type identifier, which may have been determined by parsing the PAN. In various embodiments, account type request 704 can include just the account type identifier, an issuer identifier (which includes the account type identifier and a bank identifier), or the entire PAN. Account detection service 710 can include one or more server computers. In this implementation, account database 720 is external to merchant processor computer 120. An account type 706 is returned to merchant processor computer 120 in response to account type request 704.

Merchant processor computer 120 can populate a merchant defined field with the account type, and then forward a fraud request 707 to fraud detection system 118. Fraud request 707 includes the account type and can include any other data, e.g., transaction information. A decision manager subsystem (e.g., transaction analyzer module 118(E)) can then apply merchant defined rules and return a decision result 708 to merchant processor computer 120. Decision result 708 can be the authorization result, a fraud level, or other intermediate result. Merchant processor computer then sends an authorization result 709 to merchant computer 110. In one implementation, transaction review module 120(C) can use decision result 708 to generate authorization result 709, which may involve comparing a fraud level to various threshold ranges (which can alternatively be performed by fraud detection system 118).

As optional steps, merchant processor computer 120 can send an authorization request 711 to an issuer computer (e.g., via intermediate computers as shown in FIG. 1) and receive an authorization response 712. Authorization response 712 can be included in fraud request 707. Authorization response 712 can include whether the transaction is accepted or rejected by the issuer, whether a card is lost/stolen, as well as any other suitable data. In one embodiment, the account type can be included in authorization request 711.

The fraud analysis in response to fraud request 707 can be performed without the authorization response 712, and may be performed before authorization request 711 is sent to an issuer computer. For instance, the fraud analysis can identify a high level of risk based on the available data (e.g., the transaction information and the account type), and a rejection of the transaction can be sent back to merchant computer 110 without sending authorization request 711. As another example, the fraud analysis can identify that the designated goods or services provides a high level of risk (e.g., when the transaction involves a recurring payment). In such a case, an authorization result can include a discount to use a different account (e.g., a credit card vs. a debit card) before sending authorization request 711.

Embodiments can use various application programming interfaces (APIs) to communicate messages and to prompt certain functionality. A Web Services API that is used in embodiments of the invention may be a SOAP-based web services interface that provides Standard CPS X.509 token verification security using the CyberSource Simple Order API (SOAPI) Interface. As noted above, in some embodiments, an account detection API may accept a 1-9 length BIN, conduct a BIN range lookup, and return lookup results. A detection and decision API may append the lookup result to a merchant defined field, invoke a module of fraud detection system 118, and return a result.

In the examples in FIG. 7, merchant computer 110 does not need its own account database or a separate orchestration service at the point of sale that would detect the account type and perform internal business logic. Authorization result 709 can have the same format as a typical authorization response 712, and thus APIs of merchant computer 110 would not need to change. In other embodiments, merchant computer 110 can be a server computer that performs all or a portion of steps described herein.

C. Payment Processor Performs Account Lookup

Figure 8:
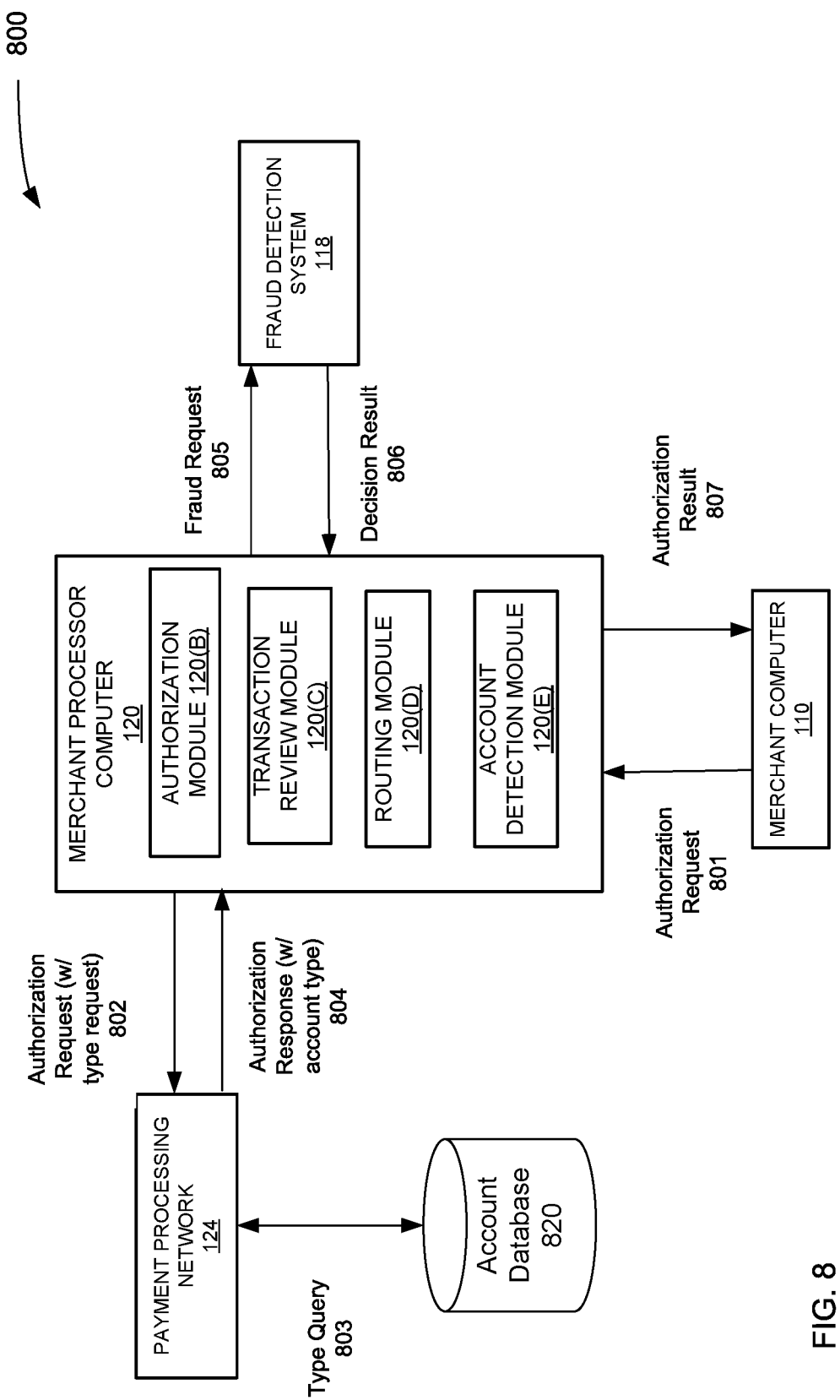
FIG. 8 shows a system and a corresponding workflow for processing an authorization request to provide an authorization result according to embodiments of the present invention.

FIG. 8 shows a system 800 and a corresponding workflow for processing an authorization request to provide an authorization result according to embodiments of the present invention. Various workflows are described with respect to system 800. Certain aspects of system 700 also apply to system 800.

Merchant computer 110 sends an authorization request 801 to merchant processor computer 120. Authorization request 801 can include a PAN and be for a transaction between merchant computer 110 and a consumer. Authorization request 801 can include an account detection request such that merchant processor computer 120 obtains an account type.

In this example, merchant processor computer 120 obtains the account type from payment processing network 124. In this example, payment processing network 124 can act as account detection service 710 in one of the examples of system 700. Merchant processor computer 120 can send authorization request 803 to payment processing network 124 (e.g., via other computers as shown in FIG. 1). Authorization request 802 can include an account type request. Authorization request 802 can include an entire issue identifier (e.g., an entire BIN) or just part of it. In another embodiment, the type request and the authorization request are sent separately. In one implementation, account detection module 120(E) can send the type request to payment processing network 124.

Payment processing network 124 can have access to an internal or external account database 820 and submit a type query 803, which may also include a request for bank information. An authorization response 804 can include the account type, a response (e.g., accept, reject, etc.), and any other relevant information. Authorization response 804 can include information obtained from an issuer computer, e.g., an accept or reject as determined by the issuer computer.

Merchant processor computer 120 can populate a merchant defined field with the account type, and then forward a fraud request 805 to fraud detection system 118, as with system 700. A decision manager subsystem (e.g., transaction analyzer module 118(E)) can then apply merchant defined rules and can return a decision result 806 to merchant processor computer 120. Merchant processor computer 120 then sends an authorization result 807 to merchant computer 110. In one implementation, transaction review module 120(C) can use decision result 808 to generate authorization result 809, which may involve comparing a fraud level to various threshold ranges (which can also be performed by fraud detection system 118).

In the example where authorization request 802 includes a request for account type, merchant processor computer 120 does not need to send a separate message to a separate account detection service. And, merchant processor computer 120 does not need to maintain its own account database. And, as fraud detection system 118 can use the authorization response and the account type, it can be beneficial to obtain them at the same time.

D. Merchant Computer Performs Account Lookup

Figure 9:
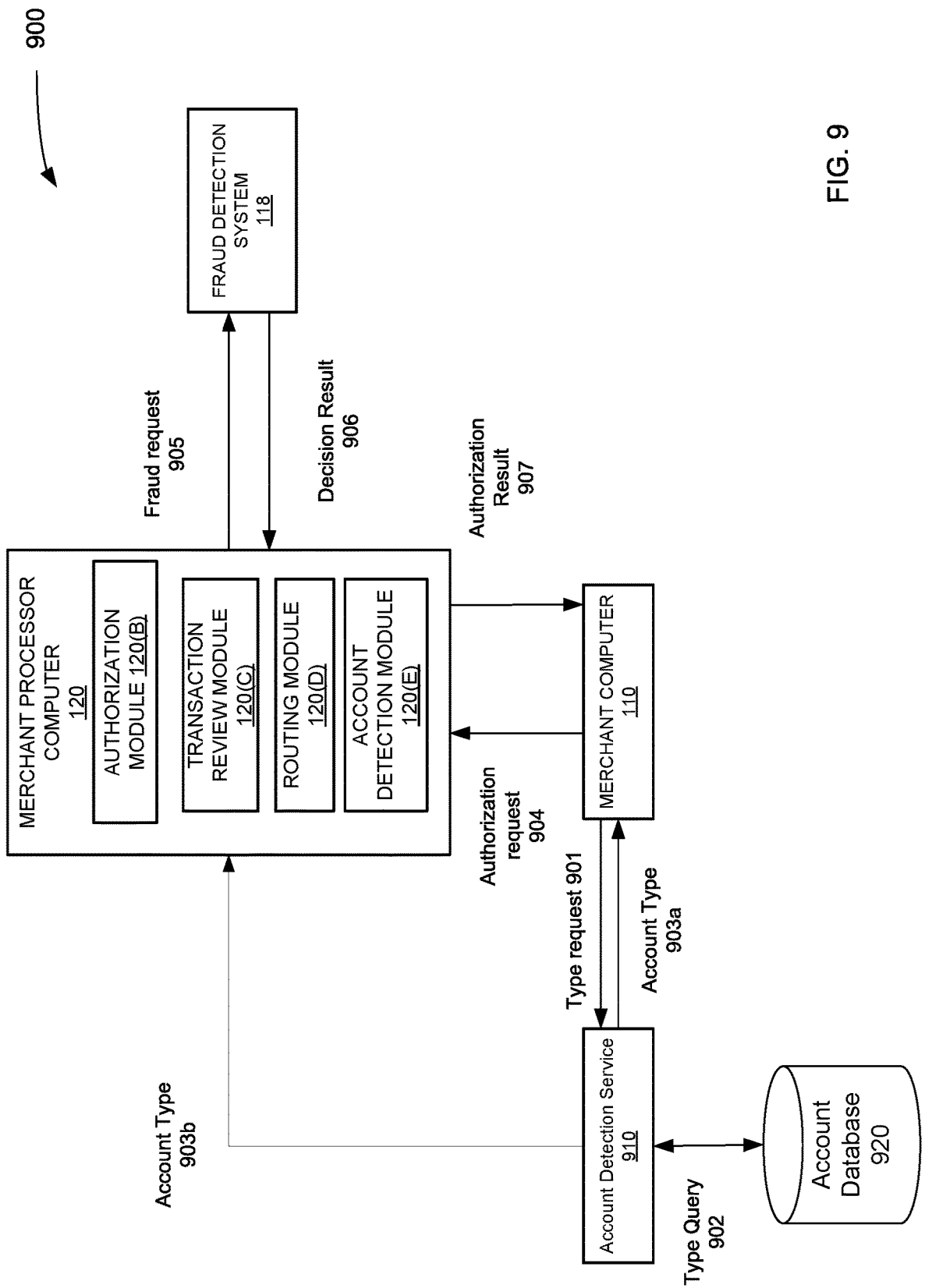
FIG. 9 shows a system and a corresponding workflow for processing an authorization request to provide an authorization result according to embodiments of the present invention.

FIG. 9 shows a system 900 and a corresponding workflow for processing an authorization request to provide an authorization result according to embodiments of the present invention. Various workflows are described with respect to system 900. Certain aspects of systems 700 and 800 also apply to system 900, and vice versa.

Merchant computer 110 can parse the PAN from the consumer to obtain a bank identifier and an account type identifier, which may be part of a BIN. Either of the identifiers can be used independently to perform a lookup of bank information and account type information, or together in a BIN range lookup to determine both.

In one implementation, merchant computer 110 can send an account type request 901 to an account detection service 910, which can send a type query 902 to account database 920. For example, merchant computer 110 may have received a prepaid account number from a customer, but it may not be readily apparent to the merchant computer 110 that this is a prepaid account number. The prepaid account number is then included in the detect request. Account detection service 910 can validate the request, and then perform an account range lookup.

In one embodiment, account database 920 is external to merchant processor computer 120. An account type 903a is returned to merchant computer 110 in response to account type request 901. Alternately, account detection service 910 can send account type 903b to merchant processor computer 120. Account database 920 can correspond to database 510 in FIG. 5.

In another embodiment, merchant computer 110 can include an account database 920 that includes information about account types, and can include bank information. Thus, a type query 901 can be submitted directly to account database 920, and account type 903a can be returned directly to merchant computer from account database 920. Bank information can also be received as a result of the query.

Regardless of how a merchant computer 110 obtains the account type, a merchant computer 110 can perform a fraud analysis based on the account type. Any of the analysis described above can be performed by merchant computer 110 to obtain a decision result and an authorization result (e.g., as to whether to deny the transaction or change the transaction). Typically, to obtain approval, an authorization request would still be made.

Merchant computer 110 sends an authorization request 904 to merchant processor computer 120. In an embodiment where account type 903b is sent from account detection service 910 to merchant processor computer 120, authorization request 904 can be sent to merchant processor computer 120 via account detection service 910. For example, account detection service 910 can perform a BIN range lookup, inject the account type into a merchant defined field into the request, and then pass the request to merchant processor computer 120 for processing. Thus, an authorization request can be sent from merchant computer 110 to account detection service 910, which can send the authorization request to merchant processor computer 120, e.g., in a message with account type 903B.

Merchant processor computer 120 can populate a merchant defined field with the account type, and then forward a fraud request 905 to fraud detection system 118, as with system 700. A decision manager subsystem (e.g., transaction analyzer module 118(E)) can then apply merchant defined rules and can returns a decision result 806 to merchant processor computer 120. Merchant processor computer 120 then sends an authorization result 907 to merchant computer 110. In one implementation, transaction review module 120(C) can use decision result 906 to generate authorization result 907, which may involve comparing a fraud level to various threshold ranges (which can also be performed by fraud detection system 118).

IV. Authorization Based on Fraud Level

As described above, the merchant can define a very specific set of rules to be used by fraud detection system 118 in determining a fraud level based on the payment account type. Specific rules can also be defined for determining the authorization level based on the fraud level, e.g., where the rules can be implemented by transaction review module 120(C) or transaction analyzer module 118(E). For example, if a prepaid card is being used for the transaction, the transaction can be marked for review. Thus, while the authorization response received from an issuer bank (e.g., authorization response 712) might indicate an approval from issuer, fraud detection system 118 can still identify the transaction as fraudulent or high risk, e.g., using rules defined by the merchant.

For an authorization result of "review," the transaction can be on hold awaiting a decision on a merchant representative, e.g., who may be working a queue of transactions that have been marked for review. In such a case, the merchant representative can receive information about the transaction and an explanation for the review (e.g., a debit or prepaid account is being used). The merchant representative can then make a decision. In other cases, a merchant could reject any transactions marked for review.

In one embodiment, the authorization result can be tied one to one with a fraud level. For example, conditional logic can specify the authorization result, which corresponds to the fraud level. In other embodiments, the fraud level can be compared to ranges, with each range corresponding to a particular authorization result In the case of the authorization result being an acceptance, the merchant can treat the authorization result as an authorization and complete the transaction. The transaction can be processed at the end of the day and settled.

V. New Offer Based on Fraud Level

More complex rules can be used to determine an authorization result that changes a price of the transaction or changes the good or services being purchased in the transaction. For example, a server computer (e.g., merchant processor computer 120) can analyze the payment account type, as well as other data (e.g., an authorization response from an issuer computer or transaction information), according to defined rules. In one embodiment, when a review is indicated, further rules an determine whether a discount or a new offer for the goods and services should be provided.

For a recurring payment, a change in the goods and services can correspond to a larger amount for an initial payment that must be made up front. For example, the merchant computer or sales agent using the merchant computer could prompt for a full payment (e.g., all payments made when signing a contract) or prompt for a different payment plan (e.g., at least 6 months when signing the contact). The increase in the amount of an initial payment can be determined in various ways, e.g., based on a determination of a discount being provided (e.g., on a discount of a phone when signing up for an extended contract), the fraud level, and an amount of funds available on the account.

If the consumer does not want to continue with the change in goods or services, the consumer can provide a new account. Then, the process can restart with the account type of the new account being detected, and a new fraud level being determined. The new authorization result can be returned to the merchant.

Examples of discounts include the price of a transaction, shipping rates, or a refund of taxes. For example, a credit card might be provided a discount when establishing a recurring payment. Another example is an offer of discounts by card type (5% for co-brand/debit, 0% for credit/pre-paid).

VI. Computer System

Figure 10:
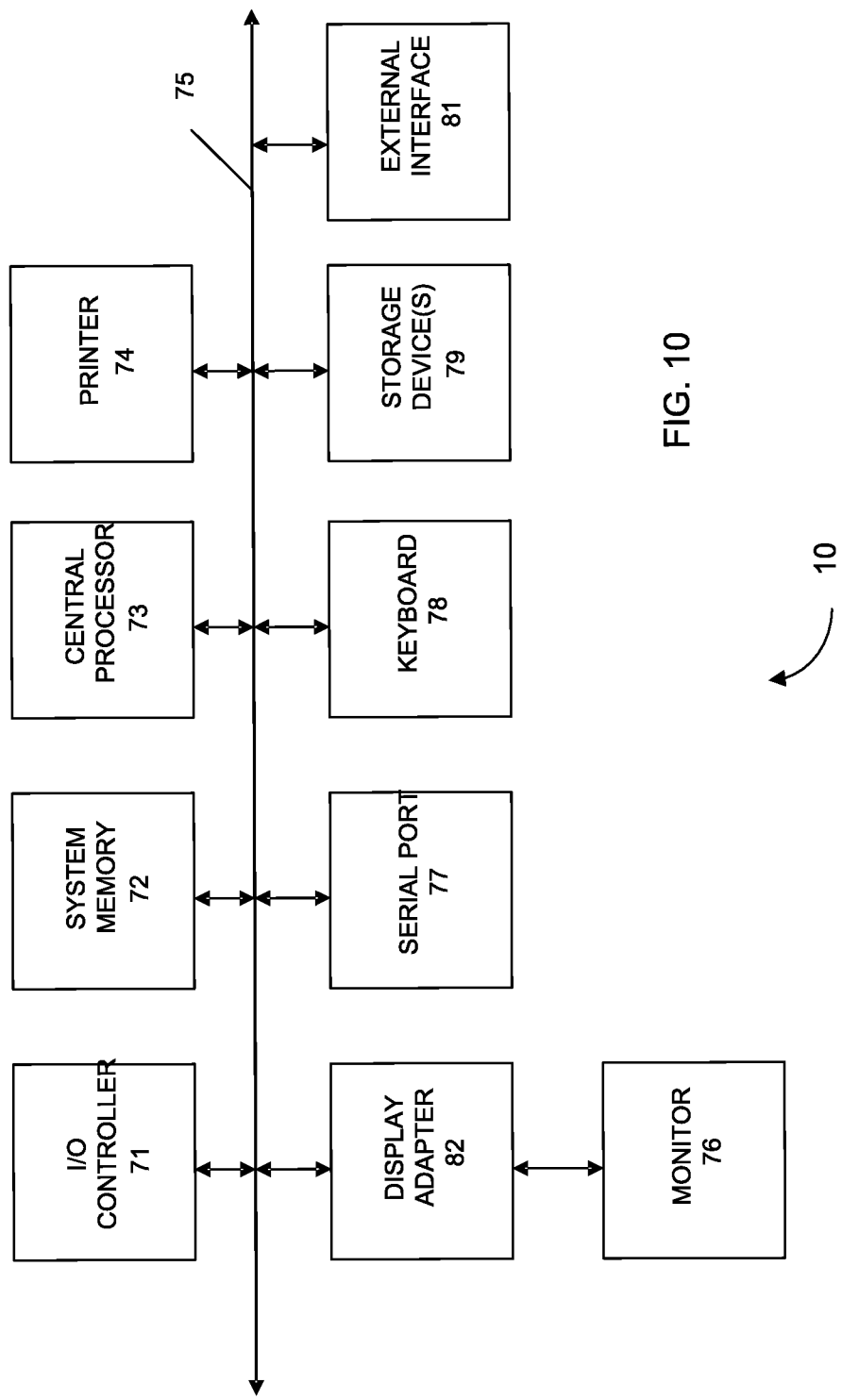
FIG. 10 shows a block diagram of a computer apparatus.

FIG. 10 is a high level block diagram of a computer system that may be used to implement any of the entities or components described above.

The subsystems shown in FIG. 10 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art, such as serial port 77. For example, serial port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C # or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for authorizing a first authorization request for a transaction between a client computer of a consumer and a merchant computer, the method comprising performing by a server computer:

storing, in a user database, authorization credentials for users of the server computer, the authorization credentials including merchant identifiers, user names, and passwords;

receiving, at a network interface, user credentials from a user computer via a communications network, the user credentials including a merchant identifier, a user name, and a password;

responsive to receiving the user credentials, accessing the user database to identify the user name and to verify the received password corresponds to a stored password linked to a user name in the user database;

receiving, from the user computer, a modification to a rule, the modification specifying one or more criteria to make a change in processing the transaction, including routing of an authorization result;

responsive to accessing the user database, using the merchant identifier to store a modified rule including the modification to the rule into a merchant profile database;

receiving, from the merchant computer via the communications network, transaction information and the first authorization request for the transaction, the transaction information including the merchant identifier corresponding to the merchant computer and an account number of an account of the consumer, wherein the account number was received by the merchant computer from the client computer;

responsive to receiving the first authorization request, parsing the account number to determine an account type identifier;

sending a query to an account database, the query including the account type identifier;

receiving an account type corresponding to the account number from the account database;

sending the transaction information and the account type to a fraud detection engine of the server computer;

determining, by the fraud detection engine, a level of fraud for the transaction using the account type and the transaction information;

retrieving, using the merchant identifier, the modified rule from the merchant profile database;

determining a first authorization result for the transaction based on the modified rule and the level of fraud, wherein the first authorization result includes the change in the transaction;

responsive to the first authorization result including the change in the transaction, transmitting (1) information about the change to the merchant computer via the communications network and (2) instructions to the merchant computer to communicate with the client computer to determine whether the change is accepted by the client computer;

receiving, via the communications network, a confirmation response from the merchant computer indicating that the client computer accepted the change; and proceeding to process the changed transaction.

2. The method of claim 1, wherein processing the changed transaction includes:

responsive to the confirmation response, generating a second authorization request that includes the change in the transaction:

sending the second authorization request to an issuer computer via a processing network;

receiving an authorization response from the issuer computer via the processing network; and transmitting a second authorization result to the merchant computer.

3. The method of claim 2, further comprising:

responsive to receiving the first authorization request, parsing the account number to determine a bank identifier;

sending a separate query to the account database, the separate query including the bank identifier; and receiving bank information corresponding to the bank identifier from the account database, wherein the bank information corresponds to the issuer computer.

4. The method of claim 2, further comprising:

responsive to receiving the first authorization request, parsing the account number to determine a bank identifier, wherein the query includes the bank identifier; and receiving bank information corresponding to the bank identifier from the account database, wherein the bank information corresponds to the issuer computer.

5. The method of claim 1, wherein the account type corresponds to one of a plurality of fields in the account database corresponding to an entry that matches the query, and wherein the account type identifier and a bank identifier are included in the query to identify the entry.

6. The method of claim 5, wherein the account type indicates the account is of a prepaid type, and wherein the modified rule specifies the change in the transaction for the account type being the prepaid type.

7. The method of claim 1, further comprising:

sending an initial authorization request to an issuer computer, the initial authorization request including the query; and receiving an initial authorization response generated by the issuer computer, wherein the initial authorization response includes the account type.

8. A computer product comprising a non-transitory computer readable medium storing a plurality of instructions that when executed control a server computer to authorize a first authorization request for a transaction between a client computer of a consumer and a merchant computer, the instructions comprising:

storing, in a user database, authorization credentials for users of the server computer, the authorization credentials including merchant identifiers, user names, and passwords;

receiving, at a network interface, user credentials from a user computer via a communications network, the user credentials including a merchant identifier, a user name, and a password;

responsive to receiving the user credentials, accessing the user database to identify the user name and to verify the received password corresponds to a stored password linked to a user name in the user database;

receiving, from the user computer, a modification to a rule, the modification specifying one or more criteria to make a change in processing the transaction, including routing of an authorization result;

responsive to accessing the user database, using the merchant identifier to store a modified rule including the modification to the rule into a merchant profile database;

receiving, from the merchant computer via the communications network, transaction information and the first authorization request for the transaction, the transaction information including the merchant identifier corresponding to the merchant computer and an account number of an account of the consumer, wherein the account number was received by the merchant computer from the client computer;

responsive to receiving the first authorization request, parsing the account number to determine an account type identifier;

sending a query to an account database, the query including the account type identifier;

receiving an account type corresponding to the account number from the account database;

sending the transaction information and the account type to a fraud detection engine of the server computer;

determining, by the fraud detection engine, a level of fraud for the transaction using the account type and the transaction information;

retrieving, using the merchant identifier, the modified rule from the merchant profile database;

determining a first authorization result for the transaction based on the modified rule and the level of fraud, wherein the first authorization result includes the change in the transaction;

responsive to the first authorization result including the change in the transaction, transmitting (1) information about the change to the merchant computer via the communications network and (2) instructions to the merchant computer to communicate with the client computer to determine whether the change is accepted by the client computer;

receiving, via the communications network, a confirmation response from the merchant computer indicating that the client computer accepted the change; and proceeding to process the changed transaction.

9. The computer product of claim 8, wherein processing the changed transaction includes:

responsive to the confirmation response, generating a second authorization request that includes the change in the transaction:

sending the second authorization request to an issuer computer via a processing network;

receiving an authorization response from the issuer computer via the processing network; and transmitting a second authorization result to the merchant computer.

10. The computer product of claim 9, wherein the instructions further comprise:

responsive to receiving the first authorization request, parsing the account number to determine a bank identifier;

sending a separate query to the account database, the separate query including the bank identifier; and receiving bank information corresponding to the bank identifier from the account database, wherein the bank information corresponds to the issuer computer.

11. The computer product of claim 9, wherein the instructions further comprise:

responsive to receiving the first authorization request, parsing the account number to determine a bank identifier, wherein the query includes the bank identifier; and receiving bank information corresponding to the bank identifier from the account database, wherein the bank information corresponds to the issuer computer.

12. The computer product of claim 8, wherein the account type corresponds to one of a plurality of fields in the account database corresponding to an entry that matches the query, and wherein the account type identifier and a bank identifier are included in the query to identify the entry.

13. The computer product of claim 12, wherein the account type indicates the account is of a prepaid type, and wherein the modified rule specifies the change in the transaction for the account type being the prepaid type.

14. The computer product of claim 8, wherein the instructions further comprise:

sending an initial authorization request to an issuer computer, the initial authorization request including the query; and receiving an initial authorization response generated by the issuer computer, wherein the initial authorization response includes the account type.

15. A server computer for authorizing a first authorization request for a transaction between a client computer of a consumer and a merchant computer, the server computer comprising one or more processors configured to:

store, in a user database, authorization credentials for users of the server computer, the authorization credentials including merchant identifiers, user names, and passwords;

receive, at a network interface, user credentials from a user computer via a communications network, the user credentials including a merchant identifier, a user name, and a password;

responsive to receiving the user credentials, access the user database to identify the user name and to verify the received password corresponds to a stored password linked to a user name in the user database;

receive, from the user computer, a modification to a rule, the modification specifying one or more criteria to make a change in processing the transaction, including routing of an authorization result;

responsive to accessing the user database, use the merchant identifier to store a modified rule including the modification to the rule into a merchant profile database;

receive, from the merchant computer via the communications network, transaction information and the first authorization request for the transaction, the transaction information including the merchant identifier corresponding to the merchant computer and an account number of an account of the consumer, wherein the account number was received by the merchant computer from the client computer;

responsive to receiving the first authorization request, parse the account number to determine an account type identifier;

send a query to an account database, the query including the account type identifier;

receive an account type corresponding to the account number from the account database;

send the transaction information and the account type to a fraud detection engine of the server computer;

determine, by the fraud detection engine, a level of fraud for the transaction using the account type and the transaction information;

retrieve, using the merchant identifier, the modified rule from the merchant profile database;

determine a first authorization result for the transaction based on the modified rule and the level of fraud, wherein the first authorization result includes the change in the transaction;

responsive to the first authorization result including the change in the transaction, transmit (1) information about the change to the merchant computer via the communications network and (2) instructions to the merchant computer to communicate with the client computer to determine whether the change is accepted by the client computer;

receive, via the communications network, a confirmation response from the merchant computer indicating that the client computer accepted the change; and proceed to process the changed transaction.

16. The server computer of claim 15, wherein processing the changed transaction includes:

responsive to the confirmation response, generating a second authorization request that includes the change in the transaction:

sending the second authorization request to an issuer computer via a processing network;

receiving an authorization response from the issuer computer via the processing network; and transmitting a second authorization result to the merchant computer.

17. The server computer of claim 16, wherein the one or more processors are further configured to:
   responsive to receiving the first authorization request, parse the account number to determine a bank identifier;
   send a separate query to the account database, the separate query including the bank identifier; and
   receive bank information corresponding to the bank identifier from the account database, wherein the bank information corresponds to the issuer computer.

18. The server computer of claim 16, wherein the one or more processors are further configured to:
   responsive to receiving the first authorization request, parse the account number to determine a bank identifier, wherein the query includes the bank identifier; and
   receive bank information corresponding to the bank identifier from the account database, wherein the bank information corresponds to the issuer computer.

19. The server computer of claim 15, wherein the account type corresponds to one of a plurality of fields in the account database corresponding to an entry that matches the query, and wherein the account type identifier and a bank identifier are included in the query to identify the entry.

20. The server computer of claim 15, wherein the one or more processors are further configured to:
   send an initial authorization request to an issuer computer, the initial authorization request including the query; and
   receive an initial authorization response generated by the issuer computer, wherein the initial authorization response includes the account type.

\* \* \* \* \*